(12) United States Patent
Nagaya et al.

(10) Patent No.: US 10,714,794 B2
(45) Date of Patent: Jul. 14, 2020

(54) LITHIUM ION SECONDARY BATTERY AND METHOD OF PRODUCING THE LITHIUM ION SECONDARY BATTERY

(71) Applicant: TOYOTA JIDOSHA KABUSHIKI KAISHA, Toyota-shi, Aichi-ken (JP)

(72) Inventors: Katsuhiko Nagaya, Toyota (JP); Shinobu Okayama, Miyoshi (JP); Kyoko Kikuchi, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 87 days.

(21) Appl. No.: 15/905,889

(22) Filed: Feb. 27, 2018

(65) Prior Publication Data

US 2018/0254532 A1 Sep. 6, 2018

(30) Foreign Application Priority Data

Mar. 3, 2017 (JP) ................................ 2017-040698

(51) Int. Cl.
| | |
|---|---|
| *H01M 10/44* | (2006.01) |
| *H01M 10/0525* | (2010.01) |
| *H01M 10/052* | (2010.01) |
| *H01M 10/42* | (2006.01) |
| *H01M 10/0587* | (2010.01) |

(52) U.S. Cl.
CPC ....... *H01M 10/448* (2013.01); *H01M 10/052* (2013.01); *H01M 10/0525* (2013.01); *H01M 10/4242* (2013.01); *H01M 10/0587* (2013.01)

(58) Field of Classification Search
None
See application file for complete search history.

(56) References Cited

U.S. PATENT DOCUMENTS

| | | | | |
|---|---|---|---|---|
| 2012/0177974 | A1* | 7/2012 | Nakajima | H01M 2/166 429/144 |
| 2012/0208084 | A1* | 8/2012 | Hiraoka | H01M 4/134 429/211 |
| 2013/0115486 | A1 | 5/2013 | Saito et al. | |

(Continued)

FOREIGN PATENT DOCUMENTS

| | | |
|---|---|---|
| JP | 11213987 A | 8/1999 |
| JP | 2002-324585 A | 11/2002 |

(Continued)

*Primary Examiner* — Scott J. Chmielecki
(74) *Attorney, Agent, or Firm* — Sughrue Mion, PLLC

(57) ABSTRACT

A lithium ion secondary battery includes a housing. An electrode group and an electrolytic solution are in the housing. The electrode group is immersed in the electrolytic solution. The electrode group includes a positive electrode including a positive electrode active material layer and a negative electrode including a negative electrode current collector and a negative electrode active material layer. The negative electrode active material layer is disposed on a surface of the negative electrode current collector. A metal piece is electrically connected to the negative electrode current collector. The metal piece is disposed at a position at which at least a part of the metal piece is immersed in the electrolytic solution. An oxidation-reduction potential of the metal piece is within an overdischarging voltage range and is lower than an oxidation-reduction potential of the negative electrode current collector.

16 Claims, 7 Drawing Sheets

(56) References Cited

U.S. PATENT DOCUMENTS

2015/0072197 A1* 3/2015 Sawanishi ............. H01M 10/48
429/90
2015/0236330 A1* 8/2015 Takami .................. H01M 2/32
429/158
2015/0357648 A1* 12/2015 Sugimoto ......... H01M 10/0525
429/217

FOREIGN PATENT DOCUMENTS

| | | |
|---|---|---|
| JP | 2010040466 A | 2/2010 |
| JP | 2012-028024 A | 2/2012 |
| JP | 2012-089471 A | 5/2012 |
| JP | 2015072805 A | 4/2015 |
| JP | 2015228294 A | 12/2015 |
| JP | 2016-076358 A | 5/2016 |
| JP | 2017010787 A | 1/2017 |

* cited by examiner

LITHIUM ION SECONDARY BATTERY AND METHOD OF PRODUCING THE LITHIUM ION SECONDARY BATTERY

INCORPORATION BY REFERENCE

The disclosure of Japanese Patent Application No. 2017-040698 filed on Mar. 3, 2017 including the specification, drawings and abstract is incorporated herein by reference in its entirety.

BACKGROUND

1. Technical Field

The present disclosure relates to a lithium ion secondary battery and a method of producing the lithium ion secondary battery.

2. Description of Related Art

Japanese Unexamined Patent Application Publication No. 2016-076358 (JP 2016-076358 A) discloses a lithium ion secondary battery (hereinafter simply referred to as a "battery") including a third electrode in addition to a positive electrode and a negative electrode.

SUMMARY

In JP 2016-076358 A, a method in which, when a battery capacity is reduced, lithium (Li) ions are supplied to the positive electrode or the negative electrode from the third electrode, and thus the battery capacity is recovered is proposed.

In the configuration in JP 2016-076358 A, it is necessary to separately provide the third electrode in addition to the positive electrode and the negative electrode in a battery. Therefore, a structure of the battery may be complicated. In addition, when the battery capacity is recovered, it is necessary to switch a terminal. Therefore, an operation may be complicated.

The present disclosure provides a lithium ion secondary battery that can recover a battery capacity independently of a third electrode.

A technical configuration and operations and effects of the present disclosure will be described below. However, the mechanism of action of the present disclosure includes estimation. The scope of the claims should not be considered as being limited according to the accuracy of the mechanism of action.

A first aspect of the present disclosure relates to a lithium ion secondary battery. The lithium ion secondary battery includes a housing, an electrode group, a metal piece, and an electrolytic solution. The electrode group is in the housing. The electrolytic solution is in the housing. The electrolytic solution contains lithium ions. at least a part of the electrode group is immersed in the electrolytic solution. The electrode group includes a positive electrode including a positive electrode active material layer and a negative electrode including a negative electrode current collector and a negative electrode active material layer. The positive electrode is electrically insulated from the negative electrode. The negative electrode active material layer is disposed on a surface on the negative electrode current collector. The negative electrode active material layer includes a first region that faces the positive electrode active material layer and a second region that does not face the positive electrode active material layer. The metal piece is electrically connected to the negative electrode current collector. The metal piece is disposed at a position at which at least a part of the metal piece is immersed in the electrolytic solution. An oxidation-reduction potential of the metal piece is within an overdischarging voltage range and is lower than an oxidation-reduction potential of the negative electrode current collector.

In the first aspect, the metal piece is disposed in the battery instead of a third electrode. It is possible to obtain a configuration in which the battery capacity can be recovered according to the metal piece. That is, a battery in which the battery capacity can be recovered independently of the third electrode can be provided. In the first aspect, a simpler battery structure than that of a case in which the third electrode is provided is expected.

For example, inactive Li ions that do not contribute to charging and discharging may be generated in the battery during storage at a high temperature or when the battery is used such as charging and discharging. Examples of the inactive Li ions include Li ions incorporated into a solid electrolyte interface (SEI) and Li ions diffusing into a non-facing region (second region) of the negative electrode active material layer. The inactive Li ions are not thought to be able to return to the positive electrode active material layer. The battery capacity is thought to be reduced accordingly. According to the first aspect, it is considered that the battery capacity can be recovered without switching the terminal as follows.

First, the battery is discharged to the overdischarging voltage range. The "overdischarging voltage range" refers to a voltage range that is lower than a lower limit voltage of a normal operation voltage range. For example, when the normal operation voltage range of the battery is set to 3.0 V to 4.1 V, a range of less than 3.0 V is the overdischarging voltage range. The oxidation-reduction potential of the metal piece is in the overdischarging voltage range. Therefore, as long as the battery is not discharged to the overdischarging voltage range, the metal piece is thought to be unlikely to be eluted.

FIG. 1 is a first conceptual diagram for explaining a recovery process. It is thought that the battery is discharged so that a potential of the negative electrode is equal to or higher than an oxidation-reduction potential of a metal piece 300, and thus metal ions ($A^+$) are eluted from the metal piece 300. Further, the oxidation-reduction potential of the metal piece 300 is lower than an oxidation-reduction potential of a negative electrode current collector 221. Therefore, it is thought that the battery can be discharged so that the negative electrode current collector 221 does not corrode and metal ions are eluted from the metal piece 300.

Electrons ($e^-$) generated when metal ions are eluted are thought to be supplied to a positive electrode active material layer 212. Therefore, Li ions ($Li^+$) in the electrolytic solution are thought to be also supplied to the positive electrode active material layer 212. That is, the following oxidation-reduction reaction is thought to occur in the battery.

$A \rightarrow A^+ + e^-$     metal piece (negative electrode side):

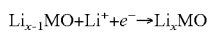

$Li_{x-1}MO + Li^+ + e^- \rightarrow Li_xMO$     positive electrode:

In the above reaction formula, "A" denotes the metal piece 300, and "$A^+$" denotes a metal ion. "$Li_{x-1}MO$" denotes a positive electrode active material when inactive Li ions are generated in the battery. "$Li_xMO$" denotes a positive electrode active material that has received Li ions. As shown in the above reaction formula, without a reaction of the negative electrode active material, Li ions may be filled into the positive electrode active material. Therefore, recovery of the battery capacity is expected.

FIG. 2 is a second conceptual diagram for explaining a recovery process. A negative electrode active material layer 222 includes a facing region (a first region 1) that faces the positive electrode active material layer 212 and (a second region 2) that does not face the positive electrode active material layer 212. When the battery is used, Li ions may diffuse from the first region 1 to the second region 2. Li ions diffusing into the second region 2 are considered to be inactive Li ions.

In the overdischarging voltage range, an amount of Li ions in the first region 1 is thought to be very small. On the other hand, since the second region 2 does not face the positive electrode active material layer 212, Li ions ($Li^+$) diffusing into the second region 2 are thought to remain in the second region 2 even in the overdischarging voltage range. Accordingly, in the overdischarging voltage range, the second region 2 is expected to have a lower potential than the first region 1. Therefore, when the battery is left in the overdischarging voltage range, metal ions ($A^+$) eluted from the metal piece 300 are expected to be reduced in the second region 2 with a low potential, and be returned to the metal. Here, "being left" indicates that a rest state in which neither charging from outside of the battery nor discharging to outside of the battery is performed is maintained.

The second region 2 does not face the positive electrode active material layer 212. Therefore, it is expected that the metal precipitated in the second region 2 will not adversely influence performance in the normal operation voltage range thereafter.

FIG. 3 is a third conceptual diagram for explaining a recovery process. After being left, when the battery is charged, the voltage is returned to be within the normal operation voltage range (for example, about 3.6 V). That is, Li ions are supplied from the positive electrode active material layer 212 to the first region 1 of the negative electrode active material layer 222. Thus, the recovery process is completed.

In the first aspect, a difference between the oxidation-reduction potential of the metal piece and the oxidation-reduction potential of the negative electrode current collector may be within a range of 0.6 V to 2 V In the first aspect, the negative electrode current collector may contain copper (Cu). The metal piece may contain at least one selected from the group consisting of iron (Fe), nickel (Ni) and titanium (Ti). The oxidation-reduction potential of Fe, Ni and Ti is thought to be within the overdischarging voltage range. In addition, the oxidation-reduction potential of Fe, Ni, and Ti is thought to be lower than the oxidation-reduction potential of Cu.

In the first aspect, the same type of metal as the metal piece may be precipitated in the second region. As described above, when the battery capacity is recovered, a metal is thought to be precipitated in the second region. When the battery capacity is recovered, a substantial increase in a battery lifespan is expected.

In the first aspect, the metal piece may be disposed such that an entire surface of the metal piece is immersed in the electrolytic solution.

In the first aspect, the metal piece may be disposed at a position closer to the second region than the first region, and the position is on a surface of the negative electrode current collector.

A second aspect of the present disclosure relates to a method of producing a lithium ion secondary battery. The method includes (α) producing the lithium ion secondary battery of the first aspect, (β) generating inactive lithium ions in the lithium ion secondary battery, (γ) discharging the lithium ion secondary battery in which the inactive lithium ions are generated to the overdischarging voltage range, causing metal ions to be eluted from the metal piece in the electrolytic solution, and supplying the lithium ions in the electrolytic solution to the positive electrode active material layer, (δ) reducing the metal ions to a metal by leaving the lithium ion secondary battery, and (ε) charging the lithium ion secondary battery after the lithium ion secondary battery is left.

The above (γ) to (ε) constitute the recovery process. When (γ) to (ε) are sequentially performed, the battery capacity can be recovered.

In the second aspect, when the lithium ion secondary battery is charged, a new lithium secondary battery may be produced.

In the second aspect, when the lithium ion secondary battery is discharged, the lithium ion secondary battery may be discharged such that a potential of the negative electrode is equal to or higher than an oxidation-reduction potential of the metal piece and lower than an oxidation-reduction potential of the negative electrode current collector. Therefore, prevention of corrosion of the negative electrode current collector is expected.

In the second aspect, the lithium ions may diffuse into the second region, and metal ions may be reduced to a metal in the second region. When Li ions diffuse into the second region, reduction of metal ions in the second region is expected. Therefore, prevention of metal precipitation in the facing region (first region) is expected. A metal is unlikely to be precipitated in the first region that contributes to charging and discharging in the normal operation voltage range, and thus prevention of performance degradation resulting from the recovery of the battery capacity is expected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment (hereinafter simply referred to as the "present embodiment") of the present disclosure will be described below. However, the following description does <Lithium Ion Secondary Battery>

Figure 4:
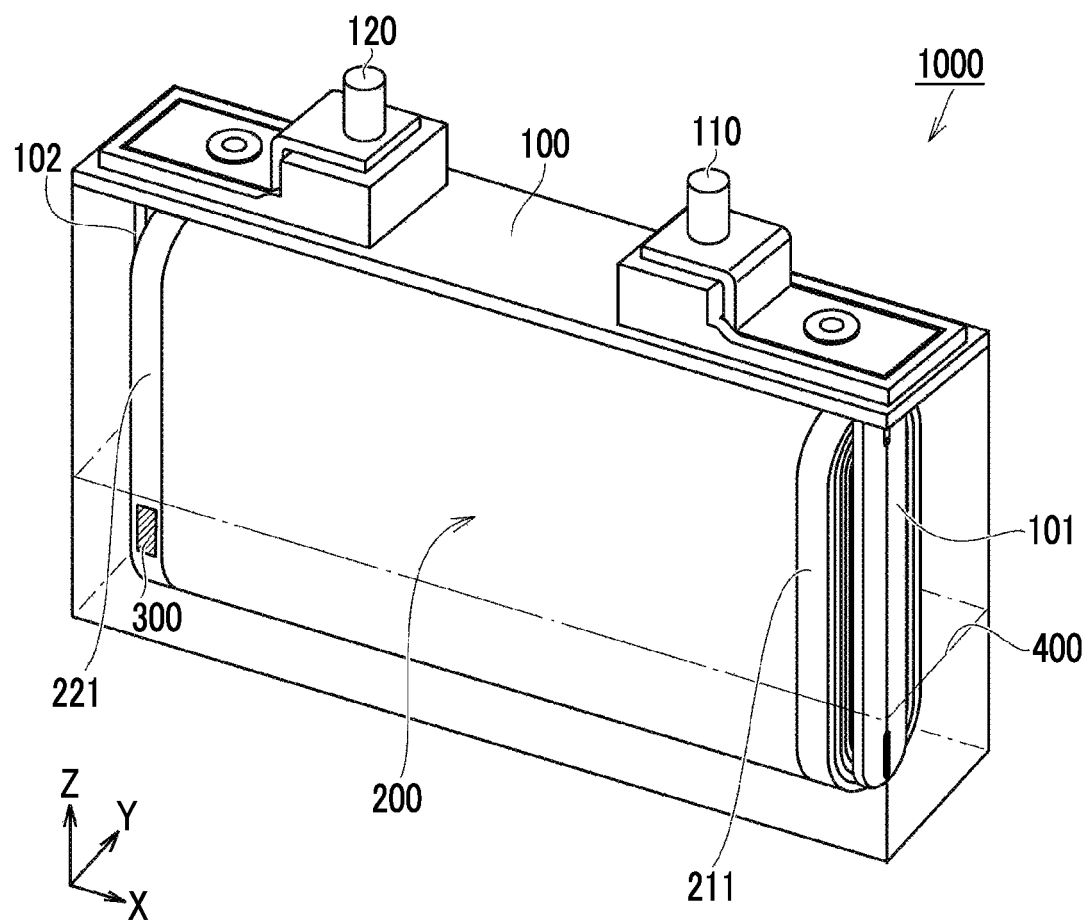
FIG. 4 is a schematic diagram showing an example of a configuration of a lithium ion secondary battery according to an embodiment of the present disclosure.

FIG. 4 is a schematic diagram showing an example of a configuration of a lithium ion secondary battery according to an embodiment of the present disclosure. A normal operation voltage range of a battery 1000 may be, for example, 3.0 V to 4.1 V. In this case, a range of less than 3.0 V is an overdischarging voltage range. However, the normal operation voltage range and the overdischarging voltage range may be appropriately changed according to types of a positive electrode active material and a negative electrode active material, a capacity design of a battery, and the like. For example, the battery 1000 has a battery capacity of 3 Ah to 30 Ah.

In the battery 1000, at least some of a battery capacity that lowers as it is used due to overdischarging (discharging to an overdischarging voltage range) is recovered. The battery 1000 includes at least a housing 100, an electrode group 200, a metal piece 300, and an electrolytic solution.

<Housing>

The housing 100 is sealed. The housing 100 may include, for example, a lid and a container. The electrode group 200 is housed in the housing 100. The electrolytic solution is stored in the housing 100. In the housing 100, an injection hole, a current interruption mechanism (CID), a gas exhaust valve, and the like may be provided. The shape of the housing 100 is not particularly limited. The housing 100 may be a rectangular shape (flat rectangular parallelepiped) shown in FIG. 4 or a cylindrical shape. The housing 100 may be made of, for example, pure aluminum (Al) or an Al alloy. The housing 100 may be a bag made of, for example, an aluminum laminate film.

<Electrode Group>

The electrode group 200 is immersed in the electrolytic solution. That is, at least some of the electrode group 200 is positioned vertically below a liquid surface 400. At least some of the electrode group 200 may be immersed in the electrolytic solution. That is, some of the electrode group 200 may be immersed in the electrolytic solution and an entire surface of the electrode group 200 may be immersed in the electrolytic solution. However, it is desirable that the electrolytic solution be impregnated into a part of the electrode group 200 that is not immersed in the electrolytic solution.

The electrode group 200 is electrically connected to a positive electrode current collecting plate 101 and a negative electrode current collecting plate 102. The positive electrode current collecting plate 101 is electrically connected to a positive electrode terminal 110. The negative electrode current collecting plate 102 is electrically connected to a negative electrode terminal 120. That is, the electrode group 200 is electrically connected to the positive electrode terminal 110 and the negative electrode terminal 120. When the negative electrode current collecting plate 102 is immersed in the electrolytic solution, it is desirable that the negative electrode current collecting plate 102 be made of a material that is unlikely to be eluted in an overdischarging voltage range.

Figure 5:
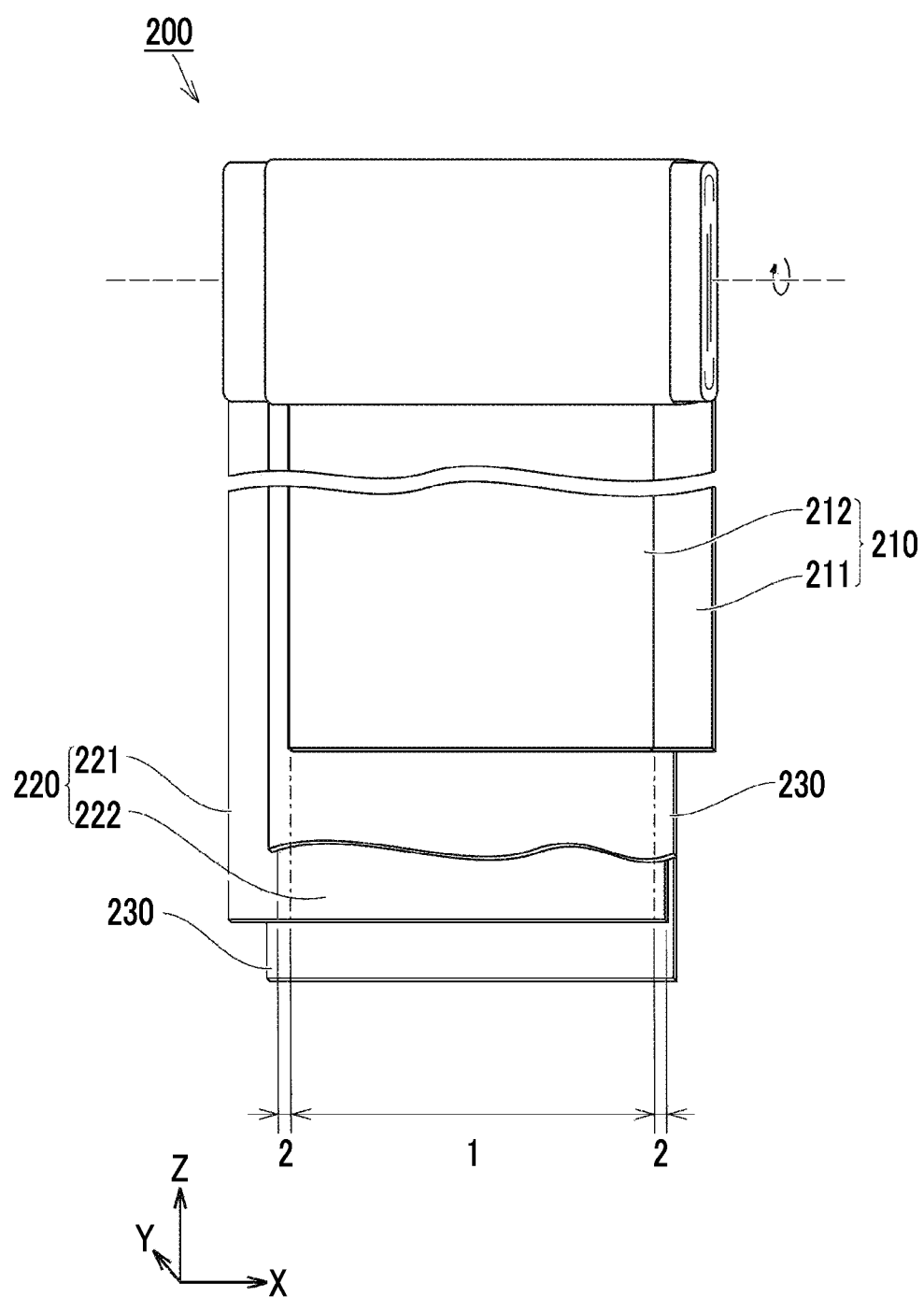
FIG. 5 is a schematic diagram showing an example of a configuration of an electrode group.

FIG. 5 is a schematic diagram showing an example of a configuration of an electrode group. The electrode group 200 includes a positive electrode 210 and a negative electrode 220. The electrode group 200 further includes a separator 230. The separator 230 is disposed between the positive electrode 210 and the negative electrode 220. The separator 230 is an electrically insulating porous film. That is, the positive electrode 210 is electrically insulated from the negative electrode 220. The separator 230 may be made of, for example, polyethylene (PE), or polypropylene (PP).

The electrode group 200 in FIG. 4 and FIG. 5 is a wound type electrode group. That is, the positive electrode 210 and the negative electrode 220 are laminated with the separator 230 therebetween, and further the positive electrode 210 and the negative electrode 220 are wound in a spiral shape so that the electrode group 200 is formed. In the electrode group 200, an electrode disposed on the outermost circumference may be the negative electrode 220. The electrode group 200 may be formed into a flat shape.

The electrode group may be a laminated type electrode group (not shown). The laminated type electrode group may be formed when positive electrodes and negative electrodes are alternately laminated with separators interposed therebetween. In the laminated type electrode group, an electrode disposed on the outermost layer may be a negative electrode.

(Positive Electrode)

The positive electrode 210 includes a positive electrode current collector 211. The positive electrode current collector 211 may be, for example, an Al foil or an Al alloy foil. The thickness of the positive electrode current collector 211 may be, for example, 10 μm to 30 μm. The positive electrode 210 includes a positive electrode active material layer 212. The positive electrode active material layer 212 is disposed on a surface of the positive electrode current collector 211. The positive electrode active material layer 212 may be disposed on both front and rear surfaces of the positive electrode current collector 211. A part of the positive electrode current collector 211 is exposed from the positive electrode active material layer 212. The exposed part may be electrically connected to the positive electrode current collecting plate 101.

It is desirable that the entire region of the positive electrode active material layer 212 face the negative electrode active material layer 222. The thickness of the positive electrode active material layer 212 may be, for example, 10 μm to 100 μm. The positive electrode active material layer 212 contains a positive electrode active material. The positive electrode active material layer 212 may further contain a conductive material, a binder, and the like. The positive electrode active material layer 212 may contain, for example, 80 mass % to 98 mass % of the positive electrode active material, 1 mass % to 10 mass % of the conductive material, and 1 mass % to 10 mass % of the binder.

The positive electrode active material is not particularly limited. The positive electrode active material may be, for example, $LiCoO_2$, $LiNiO_2$, $LiMnO_2$, $LiMn_2O_4$, $LiNi_{1/3}Co_{1/3}Mn_{1/3}O_2$, or $LiFePO_4$. The conductive material is not particularly limited. The conductive material may be, for example, acetylene black, thermal black, furnace black, or vapor grown carbon fibers (VGCF). The binder is not particularly limited. The binder may be, for example, polyvinylidene fluoride (PVdF), polytetrafluoroethylene (PTFE), or polyacrylic acid (PAA). Each of the positive electrode active material, the conductive material, and the binder may be used alone, or two or more thereof may be used in combination.

(Negative Electrode)

The negative electrode 220 includes a negative electrode current collector 221 and a negative electrode active material layer 222. The negative electrode current collector 221 may be, for example, a Cu foil. That is, the negative electrode current collector 221 may contain Cu. The Cu foil may be a pure Cu foil or a Cu alloy foil. The thickness of the negative electrode current collector 221 may be, for example, 5 µm to 30 µm. A part of the negative electrode current collector 221 is exposed from the negative electrode active material layer 222. The exposed part may be electrically connected to the negative electrode current collecting plate 102.

The negative electrode active material layer 222 is disposed on a surface of the negative electrode current collector 221. The negative electrode active material layer 222 may be disposed on both front and rear surfaces of the negative electrode current collector 221. The negative electrode active material layer 222 has a larger area than the positive electrode active material layer 212. The negative electrode active material layer 222 includes a first region 1 that faces the positive electrode active material layer 212 and a second region 2 that does not face the positive electrode active material layer 212. In the normal operation voltage range, it is thought that a charging and discharging reaction occurs in the first region 1. On the other hand, it is thought that no charging and discharging reaction occurs in the second region 2. However, for example, during storage at a high temperature, Li ions may diffuse from the first region 1 into the second region 2. Li ions diffusing into the second region 2 are thought to become inactive Li ions. Here, when an active material layer disposed on the outermost circumference of the electrode group 200 is the negative electrode active material layer 222, the negative electrode active material layer 222 also becomes the second region 2 (non-facing region).

When the battery 1000 has a history of recovering a battery capacity, the same type of metal as the metal piece 300 to be described below may be precipitated in the second region 2. When a metal is precipitated in the second region 2 that does not face the positive electrode active material layer 212, prevention of precipitation of a metal in the first region 1 that faces the positive electrode active material layer 212 is expected. Therefore, prevention of performance degradation resulting from the recovery process is expected.

The thickness of the negative electrode active material layer 222 may be, for example, 10 µm to 100 µm. The negative electrode active material layer 222 contains a negative electrode active material. The negative electrode active material layer 222 may further contain a conductive material, a binder, and the like. The negative electrode active material layer 222 may contain, for example, 80 mass % to 99.9 mass % of the negative electrode active material, 0 mass % to 15 mass % of the conductive material, and 0.1 mass % to 5 mass % of the binder.

The negative electrode active material is not particularly limited. The negative electrode active material may be, for example, graphite, easily graphitizable carbon, non-graphitizable carbon, silicon, a silicon oxide, tin, or a tin oxide. The conductive material is not particularly limited. The conductive material may be, for example, acetylene black. For example, when a negative electrode active material having high electron conductivity such as graphite is used, the conductive material may not be used. The binder is not particularly limited. The binder may be, for example, carboxymethyl cellulose (CMC), styrene butadiene rubber (SBR), or PAA. Each of the negative electrode active material, the conductive material, and the binder may be used alone, or two or more thereof may be used in combination.

<Metal Piece>

The metal piece 300 is electrically connected to the negative electrode current collector 221. For example, the metal piece 300 may be welded to the negative electrode current collector 221 by resistance welding or the like. For example, the metal piece 300 may be disposed on the surface of the negative electrode current collector 221. The battery 1000 may include one metal piece 300 alone or two or more metal pieces 300.

As shown in FIG. 4, the metal piece 300 is disposed at a position at which it is immersed in the electrolytic solution (a position vertically below the liquid surface 400). At least a part of the metal piece 300 may be immersed in the electrolytic solution. That is, a part of the metal piece 300 may be immersed in the electrolytic solution and the entire metal piece 300 (the entire surface of metal piece 300) may be immersed in the electrolytic solution. When the entire metal piece 300 is immersed in the electrolytic solution, for example, improvement in efficiency of the recovery process is expected.

The metal piece 300 may be disposed at a position away from the first region 1 (facing region) and at a position close to the second region 2 (non-facing region). In other words, the metal piece 300 may be disposed at a position closer to the second region 2 than the first region 1 on the surface of the negative electrode current collector 221. Therefore, it is expected that a metal is likely to be precipitated in the second region 2 and a metal is unlikely to be precipitated in the first region 1. As shown in FIG. 4, when the electrode group is a winding type, the metal piece 300 may be disposed on the outermost circumference of the electrode group 200. When the electrode group is a laminate type, the metal piece may be disposed on the outermost layer of the electrode group.

The shape and size of the metal piece 300 are not particularly limited. The shape and size of the metal piece 300 may be appropriately changed according to an assumed recovery capacity, the number of times the recovery process is performed, a disposition position, and the like. The thickness of the metal piece 300 may be, for example, 30 µm to 50 µm. The area of the metal piece 300 may be, for example, 25 mm$^2$ to 100 mm$^2$.

An oxidation-reduction potential of the metal piece 300 is in the overdischarging voltage range of the battery 1000. In addition, the oxidation-reduction potential of the metal piece 300 is lower than an oxidation-reduction potential of the negative electrode current collector 221. The oxidation-reduction potential may be measured by a general oxidation-reduction potential meter (ORP meter). A theoretical value and a literature value may be used in place of a measurement value. In order to prevent corrosion of the negative electrode current collector 221 resulting from the recovery process, a difference between the oxidation-reduction potential of the negative electrode current collector 221 and the oxidation-reduction potential of the metal piece 300 may be, for example, within a range of 0.6 V to 2 V, or 0.8 V to 2 V.

The metal piece 300 may be a pure metal or an alloy. When the metal piece 300 is a pure metal, for example, improvement in efficiency of the recovery process is expected.

As described above the negative electrode current collector 221 may contain, for example, Cu. In this case, for example, the metal piece 300 may contain at least one selected from the group consisting of Fe, Ni, and Ti. The oxidation-reduction potential of Fe, Ni, and Ti is thought to be in the overdischarging voltage range. In addition, the oxidation-reduction potential of Fe, Ni, and Ti is thought to be lower than the oxidation-reduction potential of Cu. The metal piece 300 may be, for example, pure Fe, pure Ni, or pure Ti. Oxidation-reduction potentials of the metals are listed below. "V (vs. Li/Li$^+$)" indicates a potential based on the oxidation-reduction potential of Li.

Fe: about 2.6 V (vs. Li/Li$^+$)
Ni: about 2.8 V (vs. Li/Li$^+$)
Ti: about 1.4 V (vs. Li/Li$^+$)
Cu: about 3.4 V (vs. Li/Li$^+$)

In order to prevent elution of the metal piece 300 in the normal operation voltage range, the oxidation-reduction potential of the metal piece 300 may be, for example, 1.4 V (vs. Li/Li$^+$) or more, or 2.6 V (vs. Li/Li$^+$) or more. The oxidation-reduction potential of the metal piece 300 may be, for example, less than 3.4 V (vs. Li/Li$^+$), or 2.8 V (vs. Li/Li$^+$) or less.

<Electrolytic Solution>

The electrolytic solution is a liquid electrolyte. The electrolytic solution contains a Li salt and a solvent. The Li salt is dissolved in the solvent. That is, the electrolytic solution contains Li ions. The electrolytic solution may contain, for example, a Li salt with a concentration of about 0.5 mol/l to 2 mol/l. The Li salt is not particularly limited. The Li salt may be, for example, LiPF$_6$, LiBF$_4$, or Li[N(FSO$_2$)$_2$]. The solvent may be, for example, a solvent mixture containing a cyclic carbonate and a chain carbonate. A mixing ratio between the cyclic carbonate and the chain carbonate may be, for example, a volume ratio of about "cyclic carbonate: chain carbonate=1:9 to 5:5."

Examples of the cyclic carbonate include ethylene carbonate (EC), propylene carbonate (PC), butylene carbonate (BC), and fluoroethylene carbonate (FEC). Examples of the chain carbonate include dimethyl carbonate (DMC), ethyl methyl carbonate (EMC), and diethyl carbonate (DEC). Each of the cyclic carbonate and the chain carbonate may be used alone, or two or more thereof may be used in combination.

The solvent may include, for example, lactone, a cyclic ether, a chain ether, and a carboxylic ester. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylic ester include methyl formate (MF), methyl acetate (MA), and methyl propionate (MP).

The electrolytic solution may contain various functional additives in addition to the Li salt and the solvent. The electrolytic solution may contain, for example, 1 mass % to 5 mass % of a functional additive. Examples of the functional additive include a gas generating agent (overcharging additive), and a film forming agent. Examples of the gas generating agent include cyclohexylbenzene (CHB), and biphenyl (BP). Examples of the film forming agent include vinylene carbonate (VC), vinylethylene carbonate (VEC), Li[B(C$_2$O$_4$)$_2$], LiPO$_2$F$_2$, propane sultone (PS), and ethylene sulfite (ES).

<Method of Producing Lithium Ion Secondary Battery>

Figure 6:
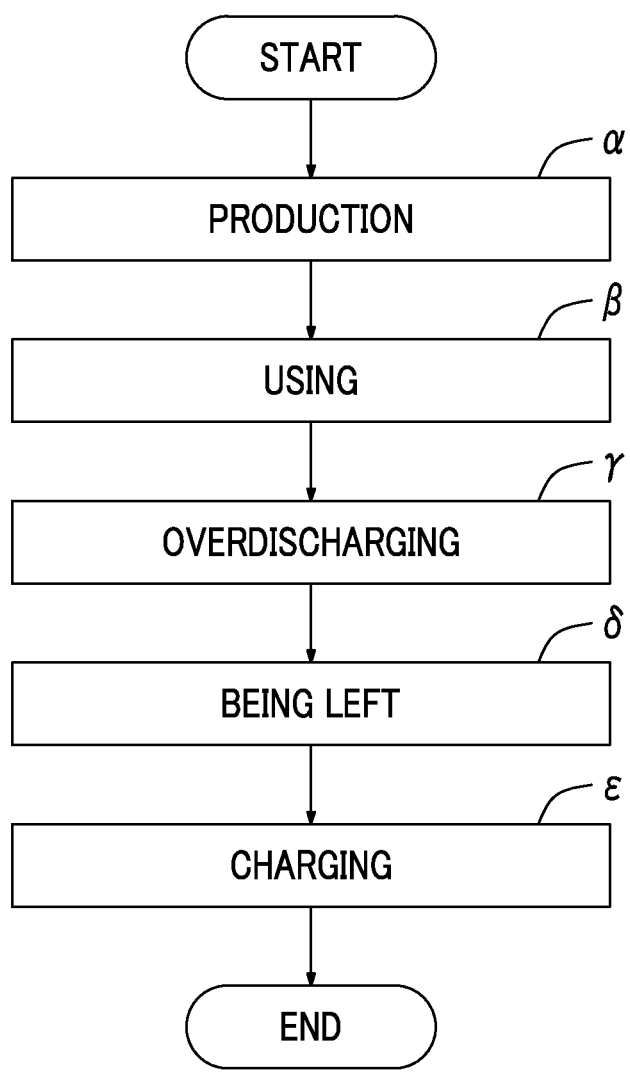
FIG. 6 is a flowchart schematically showing a method of producing a lithium ion secondary battery according to an embodiment of the present disclosure.

A method of recovering a capacity of a lithium ion secondary battery of the present embodiment, that is, a method of producing a battery whose capacity is recovered will be described below. FIG. 6 is a flowchart schematically showing a method of producing a lithium ion secondary battery according to an embodiment of the present disclosure. The production method of the present embodiment includes "(α) producing," "(β) using," "(γ) overdischarging," "(δ) being left," and "(ε) charging." "(γ) overdischarging," "(δ) being left," and "(ε) charging" constitute the recovery process. The production method of the present embodiment will be described below according to the procedures.

<(α) Producing>

The production method of the present embodiment includes producing the battery 1000 described above. The battery 1000 may be produced by a method known in the related art except that the metal piece 300 is disposed at the position described above.

<(β) Using>

The production method of the present embodiment includes generating inactive Li ions in the battery 1000. When the battery is used, inactive Li ions may be generated in the battery 1000. The battery capacity is thought to be reduced accordingly.

<(γ) Overdischarging>

The production method of the present embodiment includes eluting metal ions in the electrolytic solution from the metal piece 300 by discharging the battery 1000 in which inactive Li ions are generated in the overdischarging voltage range, and supplying Li ions in the electrolytic solution to the positive electrode active material layer 212.

Discharging may be, for example, constant current-constant voltage type discharging (CCCV discharging). A current rate during constant current discharging (CC discharging) is not particularly limited. The current rate may be, for example, about 0.1C to 2C. "C" is a unit of current rate. "1C" refers to a current rate at which the full charge capacity of the battery can be discharged in 1 hour.

Discharging is performed so that metal ions (A$^+$) are eluted from the metal piece 300 into the electrolytic solution. For example, the battery 1000 may be discharged so that the potential of the negative electrode 220 is equal to or higher than the oxidation-reduction potential of the metal piece 300 and lower than the oxidation-reduction potential of the negative electrode current collector 221. Therefore, prevention of corrosion of the negative electrode current collector 221 while metal ions are eluted is expected.

The maximum voltage for discharging is appropriately changed according to types of the positive electrode active material and the metal piece, and the like. In CCCV discharging, the maximum voltage indicates a voltage during constant voltage (CV) discharging. In the present embodiment, a current and voltage during charging and discharging may be measured in a charging and discharging device. Discharging may be performed, for example, in a room temperature environment.

The oxidation-reduction potential of Fe is about 2.6 V (vs. Li/Li$^+$). When the metal piece 300 contains Fe, the battery 1000 may be discharged to, for example, 0.4 V to 0.6 V. In this case, the potential of the negative electrode 220 is assumed to be, for example, about 2.6 to 2.8 V (vs. Li/Li$^+$).

The oxidation-reduction potential of Ni is about 2.8 V (vs. Li/Li$^+$). When the metal piece 300 contains Ni, the battery 1000 may be discharged to, for example, 0.2 to 0.4 V. In this case, the potential of the negative electrode 220 is assumed to be, for example, about 2.8 V to 3.0 V (vs. Li/Li$^+$).

The oxidation-reduction potential of Ti is about 1.4 V (vs. Li/Li$^+$). When the metal piece 300 contains Ti, the battery 1000 may be discharged to, for example, 1.6 to 1.8 V. In this case, the potential of the negative electrode 220 is assumed to be, for example, about 1.4 to 1.6 V (vs. Li/Li$^+$).

Figure 1:
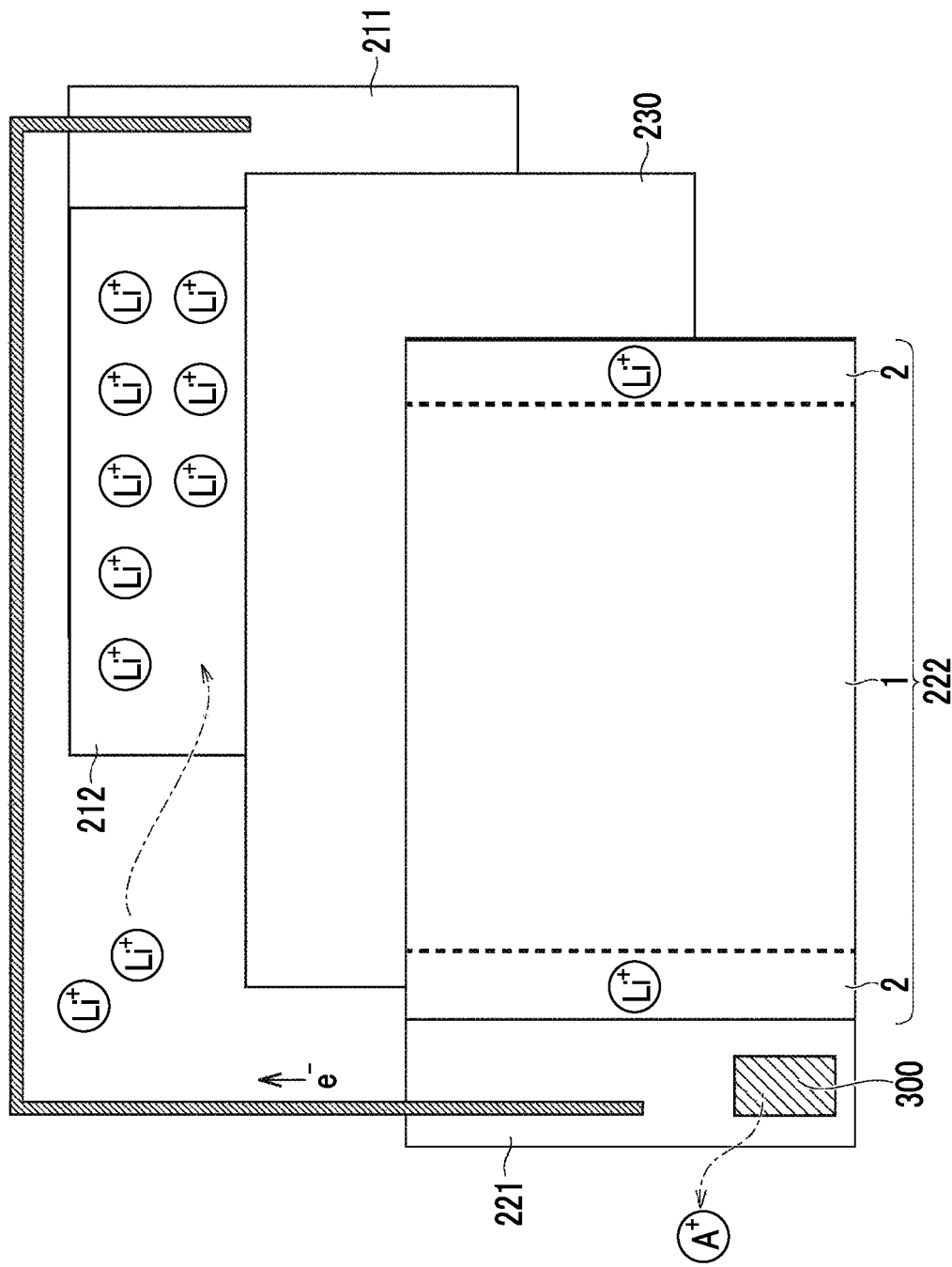
FIG. 1 is a first conceptual diagram for explaining a recovery process.

As shown in FIG. 1, when the battery 1000 is discharged to the overdischarging voltage range, Li ions (Li$^+$) included in the first region 1 (facing region) of the negative electrode active material layer 222 are thought to move to the positive electrode active material layer 212. On the other hand, Li ions diffusing into the second region 2 are thought to remain in the second region 2 without moving. This is thought to be caused by the fact that the second region 2 does not face the positive electrode active material layer 212. The potential of the second region 2 is thought to be lower than the potential of the first region 1 because Li ions remain in the second region 2.

Electrons (e⁻) are released when metal ions are eluted. The released electrons are thought to be supplied to the positive electrode active material layer 212. Accordingly, Li ions in the electrolytic solution are thought to be also supplied to the positive electrode active material layer 212.

<(δ) Being Left>

The production method of the present embodiment includes reducing metal ions to a metal by leaving the battery 1000. As long as neither charging from outside nor discharging to outside is performed, the leaving may be performed, for example, in a room temperature environment, an environment with a higher temperature than room temperature or an environment with a lower temperature than room temperature. The leaving may be performed, for example, in an environment at 0° C. to 60° C., an environment at 10° C. to 50° C., or an environment at 20° C. to 40° C.

As long as metal ions are reduced to a metal, a shorter period for being left is favorable because drawbacks resulting from overdischarging, for example, decomposition of the electrolytic solution, are prevented. The period for being left may be, for example, about 0.5 hours to 5 hours, about 0.5 hours to 2 hours, or about 0.5 hours to 1.5 hours.

Figure 2:
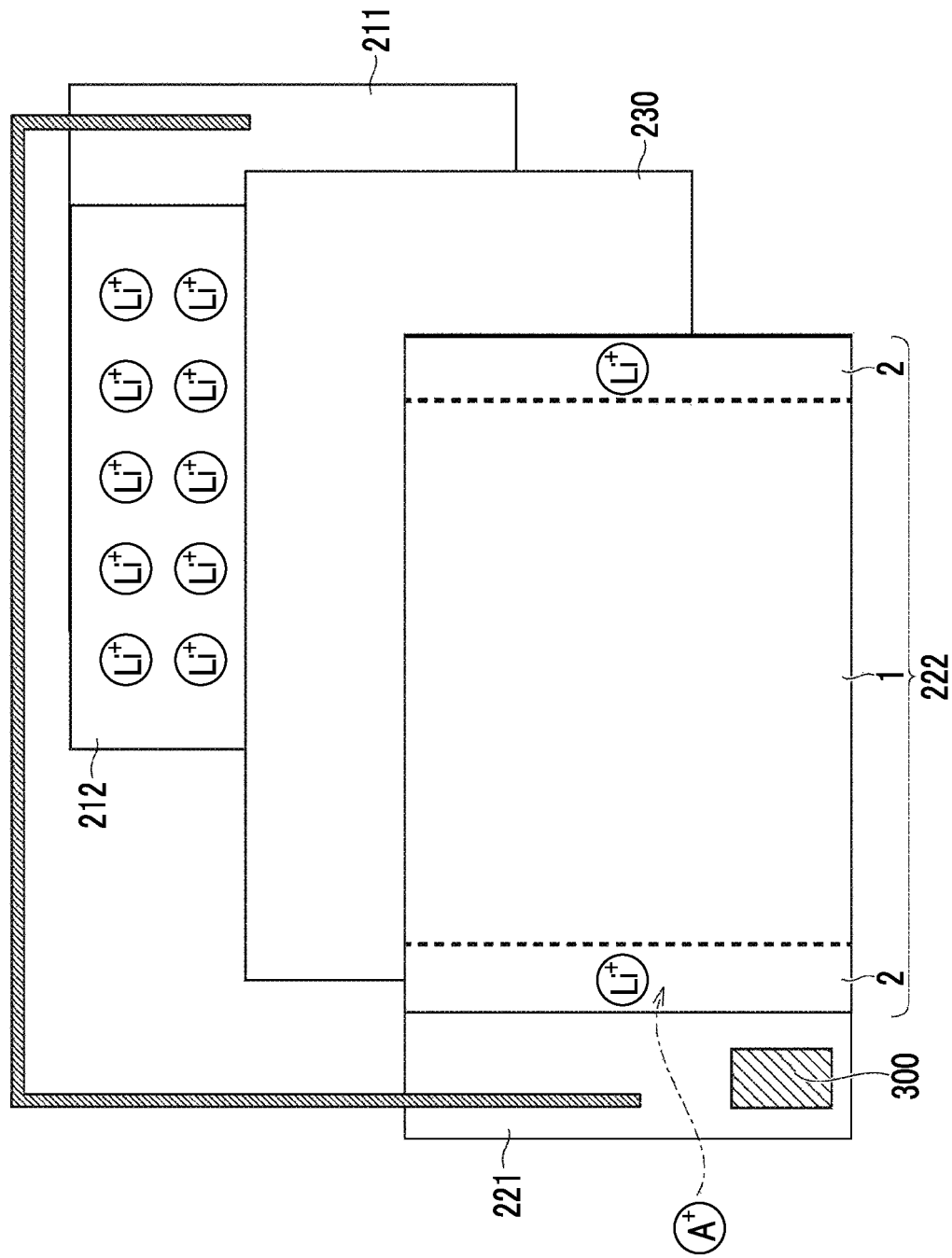
FIG. 2 is a second conceptual diagram for explaining a recovery process.

As shown in FIG. 2, when Li ions (Li⁺) diffuse into the second region 2, the second region 2 is expected to have a lower potential than the first region 1. Therefore, reduction of metal ions (A⁺) is expected to occur preferentially in the second region 2. That is, metal ions may be reduced to a metal in the second region. Accordingly, prevention of metal precipitation in the first region 1 is expected.

<(ε) Charging>

Figure 3:
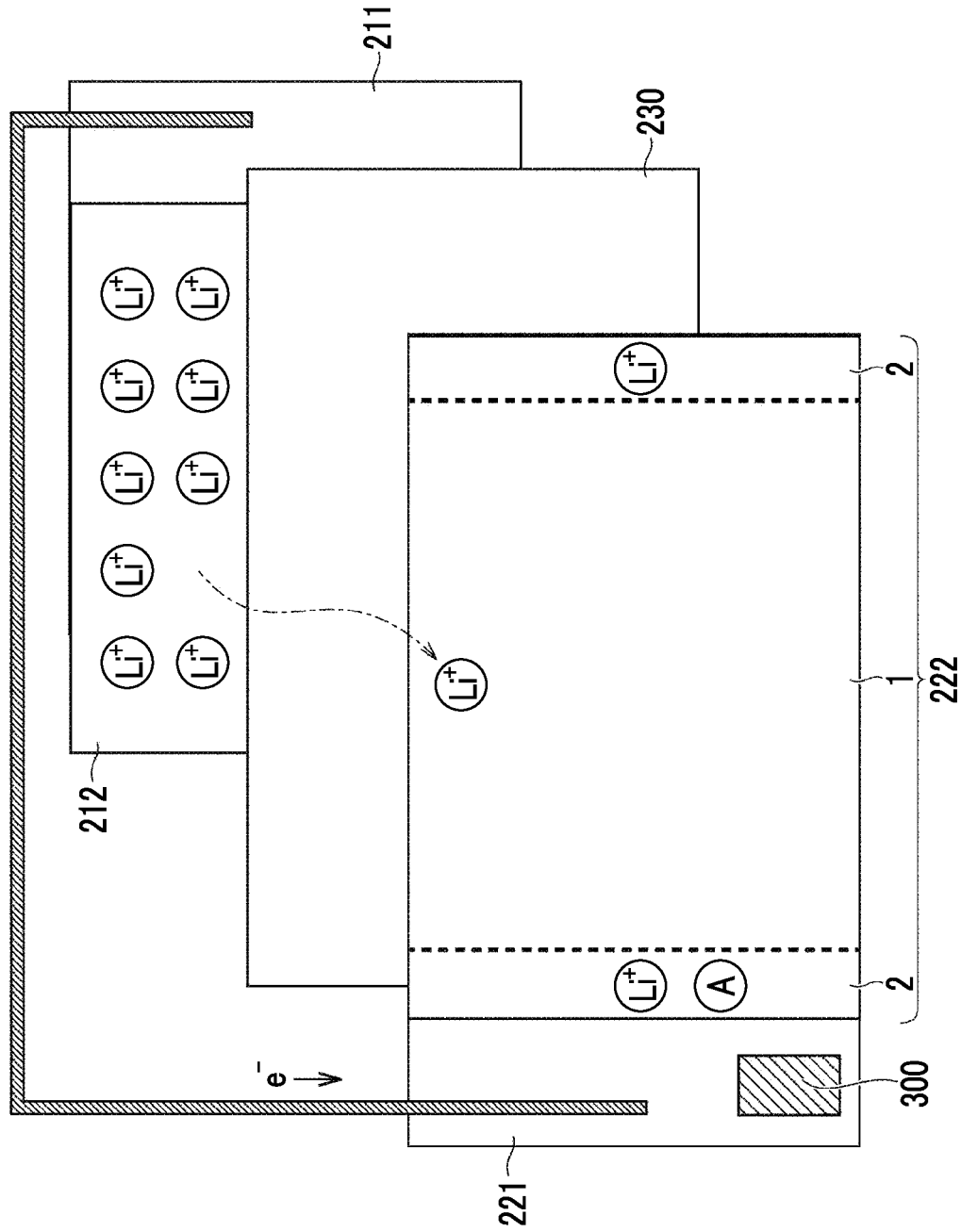
FIG. 3 is a third conceptual diagram for explaining a recovery process.

The production method of the present embodiment includes producing a new lithium ion secondary battery by charging the battery 1000 after being left. According to the charging, the voltage of the battery 1000 is returned to the normal operation voltage range. That is, as shown in FIG. 3, Li ions are supplied from the positive electrode active material layer 212 to the first region 1 of the negative electrode active material layer 222. Thus, the recovery process is completed.

The battery after the recovery process has a larger battery capacity than the battery before the recovery process. Therefore, the battery after the recovery process is considered to be a new battery that is not identical to the battery before the recovery process.

Charging may be, for example, CCCV charging. The current rate is not particularly limited. The current rate may be, for example, about 0.1C to 2C. The maximum voltage is not particularly limited. The maximum voltage may be, for example, about 3.5 V to 3.8 V. In CCCV charging, the maximum voltage indicates a voltage during CV charging. Charging may be performed, for example, in a room temperature environment.

When a cycle including "(β) using," "(γ) overdischarging," "(δ) being left," and "(ε) charging" described above is repeated, that is, when using of the battery and producing of a new battery are repeated, a substantial increase in a battery lifespan is expected.

Examples of the present disclosure will be described below. However, the following examples do not limit the scope of the claims.

Example 1. (α) Production

The battery 1000 shown in FIG. 4 was produced. A normal operation voltage range of the battery 1000 was 3.0 V to 4.1 V. The battery 1000 had a battery capacity of 5 Ah. The positive electrode active material was $LiNi_{1/3}Co_{1/3}Mn_{1/3}O_2$. The negative electrode active material was graphite. The electrode group 200 had an external size of a width of 110 mm, a height of 80 mm, and a thickness of 10 mm. The metal piece 300 was a pure Fe piece with a length of 5 mm, a width of 5 mm, and a thickness of 30 μm. The metal piece 300 was resistance-welded to the negative electrode current collector 221. The metal piece 300 was disposed at a position at which it was immersed in the electrolytic solution. In the room temperature environment, an initial battery capacity of the battery 1000 was measured.

2. (β) Using

A high temperature storage test of the battery 1000 was performed as a simulation of use. The voltage of the battery 1000 was adjusted to 3.7 V. The battery 1000 was disposed in a constant temperature chamber set at 60° C. After a predetermined period, the battery 1000 was taken out from the constant temperature chamber. The battery capacity was measured in the room temperature environment. A capacity retention rate was calculated by dividing the battery capacity after storage by the initial battery capacity. A decrease in the capacity retention rate was thought to be caused at least in part by generation of inactive Li ions. At least some of the inactive Li ions were thought to include Li ions diffusing into the second region 2.

3. (γ) Overdischarging

After the capacity retention rate was measured, the battery 1000 was discharged to the overdischarging voltage range (less than 3.0 V). Discharging was CCCV discharging. The current rate during CC discharging was 1C. The voltage during CV discharging was 0.5 V. The stop current was 1/50C. That is, the battery 1000 was thought to be discharged until the potential of the negative electrode 220 was about 2.7 V (vs. Li/Li⁺). 2.7 V (vs. Li/Li⁺) is equal to or higher than the oxidation-reduction potential [2.6 (vs. Li/Li⁺)] of the metal piece 300 (Fe) and less than the oxidation-reduction potential [3.4 V (vs. Li/Li⁺)] of the negative electrode current collector 221 (Cu).

It is thought that, when the battery 1000 was discharged to the overdischarging voltage range, metal ions (Fe ion) were eluted from the metal piece 300 (Fe), and Li ions in the electrolytic solution were supplied to the positive electrode active material layer 212.

4. (δ) being Left

After discharging, the battery 1000 was left for 1 hour. Accordingly, metal ions (Fe ion) were thought to be reduced to a metal (Fe). Reduction of Fe ions was thought to occur preferentially in the second region 2.

5. (ε) Charging

After being left, the battery 1000 was charged. Charging was CCCV charging. The current rate during CC charging was 1C. The voltage during CV charging was 3.7 V. Thus, the battery capacity of the battery 1000 was recovered. That is, a new battery was produced. After the battery capacity was recovered, the battery capacity was measured again.

Thereafter, a cycle including "2. (β) Using" to "4. (ε) Charging" was repeated. Whenever the high temperature storage test was performed and the battery capacity was recovered, the battery capacity was measured and the capacity retention rate was calculated.

Comparative Example

A battery having the same configuration as that of the example except that no metal piece 300 was disposed was produced. In the same manner as in the example, the high temperature storage test of the battery was performed. The battery capacity was measured at every predetermined period. In the comparative example, no recovery process was performed.

<Results>

Figure 7:
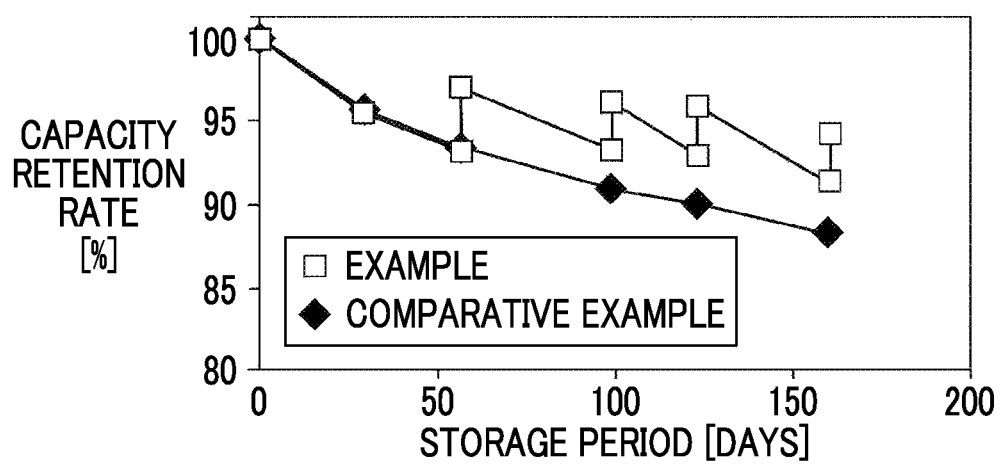
FIG. 7 is a graph showing transition of a capacity retention rate in a high temperature storage test.

FIG. 7 is a graph showing transitions of the capacity retention rate in the high temperature storage test. In the plot in the example, two points at the same time indicate rates before and after the recovery process. A point with a higher capacity retention rate indicates a rate after the recovery process. In the example, when recovery of the battery capacity was repeated, a higher capacity retention rate than that of the comparative example was maintained. That is, a battery lifespan was thought to be substantially higher in the example.

The above embodiment and examples are only examples in all respects and should not be considered as restrictive. The technical scope determined by the scope of the appended claims includes meanings equivalent to the scope of the claims and all modifications in the scope.

What is claimed is:

1. A lithium ion secondary battery comprising:
a housing;
an electrode group that is in the housing, wherein the electrode group includes a positive electrode including a positive electrode active material layer and a negative electrode including a negative electrode current collector, a negative electrode current collecting plate that is electronically connected to a negative electrode terminal and a negative electrode active material layer, the positive electrode is electrically insulated from the negative electrode, the negative electrode active material layer is disposed on a surface of the negative electrode current collector, and the negative electrode active material layer includes a first region that faces the positive electrode active material layer and a second region that does not face the positive electrode active material layer,
an electrolytic solution that is in the housing, wherein the electrolytic solution contains lithium ions and at least a part of the electrode group is immersed in the electrolytic solution, and
a metal piece, separate from the negative electrode current collecting plate, that is affixed to and electrically connected to the negative electrode current collector, wherein the metal piece is made of a different material than the negative electrode current collector, is disposed at a position at which at least a part of the metal piece is immersed in the electrolytic solution, and an oxidation-reduction potential of the metal piece is within an overdischarging voltage range and is lower than an oxidation-reduction potential of the negative electrode current collector.

2. The lithium ion secondary battery according to claim 1, wherein a difference between the oxidation-reduction potential of the metal piece and the oxidation-reduction potential of the negative electrode current collector is within a range of 0.6 V to 2 V.

3. The lithium ion secondary battery according to claim 1, wherein the negative electrode current collector contains copper, and the metal piece contains at least one selected from a group consisting of iron, nickel, and titanium.

4. The lithium ion secondary battery according to claim 1, wherein the same type of metal as the metal piece is precipitated in the second region.

5. The lithium ion secondary battery according to claim 1, wherein the metal piece is disposed such that an entire surface of the metal piece is immersed in the electrolytic solution.

6. The lithium ion secondary battery according to claim 1, wherein the metal piece is disposed at the position closer to the second region than the first region, and the position is on a surface of the negative electrode current collector.

7. A method of producing a lithium ion secondary battery, wherein the lithium ion secondary battery comprises:
a housing;
an electrode group that is in the housing, wherein the electrode group includes a positive electrode including a positive electrode active material layer and a negative electrode including a negative electrode current collector, a negative electrode current collecting plate that is electronically connected to a negative electrode terminal and a negative electrode active material layer, the positive electrode is electrically insulated from the negative electrode, the negative electrode active material layer is disposed on a surface of the negative electrode current collector, and the negative electrode active material layer includes a first region that faces the positive electrode active material layer and a second region that does not face the positive electrode active material layer,
an electrolytic solution that is in the housing, wherein the electrolytic solution contains lithium ions and at least a part of the electrode group is immersed in the electrolytic solution; and
a metal piece, separate from the negative electrode current collecting plate, that is affixed to and electrically connected to the negative electrode current collector, wherein the metal piece is made of a different material than the negative electrode current collector, is disposed at a position at which at least a part of the metal piece is immersed in the electrolytic solution, and an oxidation-reduction potential of the metal piece is within an overdischarging voltage range and is lower than an oxidation-reduction potential of the negative electrode current collector,
the method comprising:
generating inactive lithium ions in the lithium ion secondary battery;
discharging the lithium ion secondary battery in which the inactive lithium ions are generated to the overdischarging voltage range, causing metal ions to be eluted from the metal piece in the electrolytic solution, and supplying the lithium ions in the electrolytic solution to the positive electrode active material layer;
reducing the metal ions to a metal by leaving the lithium ion secondary battery; and
charging the lithium ion secondary battery after the lithium ion secondary battery is left.

8. The method according to claim 7, wherein a new lithium secondary battery is produced by charging the lithium ion secondary battery.

9. The method according to claim 7, wherein, when the lithium ion secondary battery is discharged, the lithium ion secondary battery is discharged such that a potential of the negative electrode is equal to or higher than an oxidation-reduction potential of the metal piece and lower than an oxidation-reduction potential of the negative electrode current collector.

10. The method according to claim 7, wherein, when the metal ions are reduced to the metal, the lithium ions diffuse into the second region, and the metal ions are reduced to the metal in the second region.

11. The lithium ion secondary battery of claim 1, wherein, the metal piece is welded to the negative electrode current collector.

12. The lithium ion secondary battery of claim 1, wherein, the thickness of the metal piece is 30 μm to 50 μm.

13. The lithium ion secondary battery of claim 1, wherein, the area of the metal piece is 25 mm$^2$ to 100 mm$^2$.

14. The lithium ion secondary battery of claim 1, wherein the metal piece is disposed on the surface of the negative electrode current collector.

15. The lithium ion secondary battery of claim 1, wherein the secondary battery contains a plurality of metal pieces.

16. The lithium ion secondary battery of claim 1, wherein the metal piece is disposed on the outermost layer of the electrode group.

* * * * *